United States Patent [19]
Welch et al.

[11] Patent Number: 5,447,065
[45] Date of Patent: Sep. 5, 1995

[54] HIGH-FIDELITY PARTICLE VELOCITY GAUGE FOR MEASURING STRONG MOTIONS IN A SOLID MEDIUM

[75] Inventors: Charles R. Welch; Howard G. White; Billy D. Fuller, all of Vicksburg, Miss.

[73] Assignee: The United States of America as represented by the Secretaryof the Army, Washington, D.C.

[21] Appl. No.: 123,125

[22] Filed: Sep. 17, 1993

[51] Int. Cl.⁶ .............................................. G01P 15/08
[52] U.S. Cl. ........................................ 73/493; 73/654
[58] Field of Search ................ 73/493, 517 R, 652, 73/654, 661, 866.5, 35, 431

[56] References Cited

U.S. PATENT DOCUMENTS

| | | | |
|---|---|---|---|
| 4,823,602 | 4/1989 | Christensen | 73/661 |
| 4,858,470 | 8/1989 | Kincaid et al. | 73/493 |
| 5,212,984 | 5/1993 | Norling et al. | 73/493 |
| 5,233,871 | 8/1993 | Schwarz et al. | 73/493 |

Primary Examiner—John E. Chapman
Attorney, Agent, or Firm—Katherine E. White; Luther A. Marsh

[57] ABSTRACT

Disclosed is a particle velocity gauge for measuring long term (over one millisecond duration) particle velocities in solids which are subjected to high-powered sources, such as high-explosive detonations. The gauge consists of a protective canister, external flexible cable-protection system, and rigid internal strain-isolation system. The protective canister is disc-shaped and consists of a circular bottom section with central cavity, and a removable cover with o-ring seal. The strain-isolation system consists of a rigid mounting plate atop a TEFLON bearing, and is affixed to the bottom of the central cavity. A commercial accelerometer is mounted on the rigid mounting-plate to monitor the acceleration of the canister. The gauge is capable of operating a medium normal stresses to 90,000 psi, and offers improvements in measurement fidelity over previous gauges because of the design of the internal rigid strain-isolation system, and because of the invention's density, overall shape and external dimension along its measuring axis, and its flexible cable protection system allows it to follow the mediums motions more faithfully. The gauge is also more robust than most prior gauges.

12 Claims, 3 Drawing Sheets

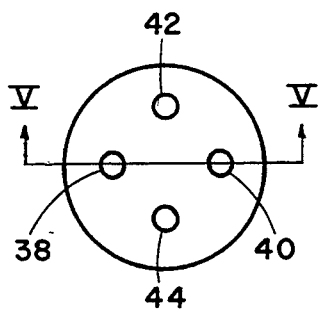
FIG. 4
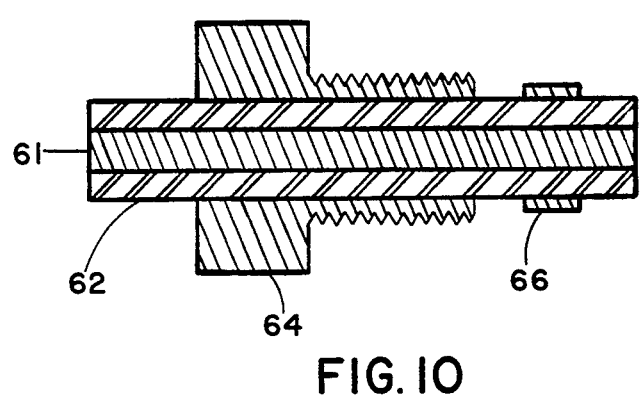
FIG. 10
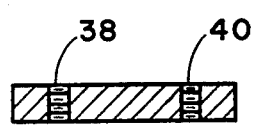
FIG. 5
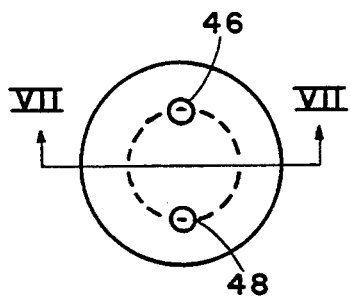
FIG. 6
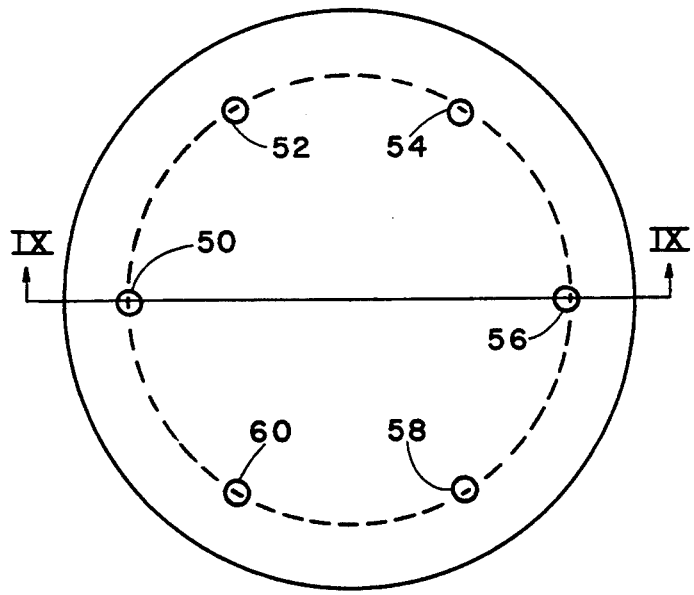
FIG. 8
FIG. 7
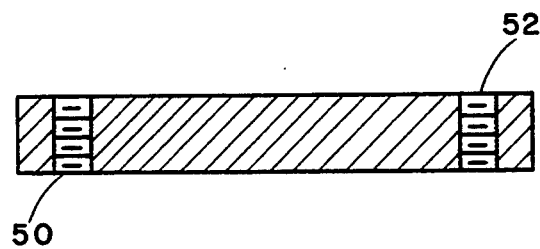
FIG. 9

HIGH-FIDELITY PARTICLE VELOCITY GAUGE FOR MEASURING STRONG MOTIONS IN A SOLID MEDIUM

BACKGROUND OF THE INVENTION

1. Field of the Invention

The present invention relates to devices for measuring motion and more particularly to devices for measuring strong motions in solid mediums such as soil, natural rock or concrete.

2. Brief Description of the Prior Art

The current invention offers improvements over previous methods to measure long-duration (over several milliseconds) medium motion in strong shock environments (that is, over 1,000 psi normal stress, over one foot of displacement, over 1,000 g's). There are two common methods for measuring these environments: with commercial accelerometers rigidly mounted to inside surfaces of protective canisters, or with commercial accelerometers mounted through shock-isolation systems to the internal surfaces of protective canisters. Examples of the rigidly-mounted systems are: Biaxial Accelerometer Mini-Canister and Biaxial Accelerometer Micro-Canister, both designed at the U.S. Army Engineer Waterways Experiment Station, Vicksburg, Miss. (about 1977) by Andres Peekna; and the Air Force Weapons Laboratory's Micro-Epoxy Canister described in M. L. Winiarz, D. W. Raymond, and R. Paul, "Survey and Sourcebook of Test Instrumentation for the DNA DUGHEST Program," Technical Report No. DNA-TR-89-283, Defense Nuclear Agency, Washington, D.C., March, 1991. Examples of measuring systems which use shock-isolation mounts are described as follows: in Petersen, C. F. and Groethe, M. A., "Research on HML/ASH Environment—Task 6—Instrumentation Development, ASH," Technical Report No. DNA-TR-88-69, Defense Nuclear Agency, Washington, D.C., Feb. 26, 1988; Welch, C. R., "Silo Test Program II Instrumentation Evaluation Test," prepared for the Defense Nuclear Agency under "Targeting-/Vulnerability of Structures," Subtask Y99QAXSC062, Work Unit 50, May, 1981; Welch, C. R., (Editor and Co-author), "Silo Test Program (STP) 3.5A Event, Volume 1—The Test Environment," WES TR SL-84-11. October, 1986; Welch, C. R. and White H. G., "Shock-Isolated Accelerometer Systems for Measuring Velocities in High-G Environments, Shock and Vibration," Bulletin 57, U.S. Army Engineer Waterways Experiment Station, Vicksburg, Miss. January, 1987; and White, H. G., "Development of a High-Range Particle-Velocity Gage," WES Technical Report SL-89-3, U.S. Army Engineer Waterways Experimental Station, Vicksburg, Miss. January, 1989.

The rigidly-mounted systems suffer from several limitations. First, since the internal accelerometers are rigidly attached to inner surfaces of the protective canisters, the accelerometers undergo straining of their bases as the protective canisters are strained by the normal stresses in the medium induced by the load source (e.g., an explosion). This strain causes a change in the electrical resistive characteristics of the accelerometers, which, in turn, causes a change in the ambient or baseline voltage of the resultant signals. This change degrades the usefulness of the measurements.

Second, the external dimensions, in the measuring direction of the instrument, of the protective canisters for the rigidly-mounted systems are relatively large (two inches or more). This causes these systems to have only relatively low-frequency, rigid-body response to the motions of the medium. See C. R. Welch, *A Full-Engulfment Engineering Model, and Its Experimental and Numerical Verification, for the Response of a Rigid Body to Ground-Shock* (Virginia Polytechnic Institute, 1993). This response, in-turn, causes these measurements to have decreased fidelity in defining the medium's motions. Third, the cable protection systems for the rigidly-mounted systems lack the robustness of the current invention. Fourth, the protective canisters of the rigidly-mounted systems are less robust than those of the current invention.

The shock-isolated systems also have several limitations. First, their external dimensions are as large or larger than the rigidly-mounted systems, and hence suffer from the second limitation cited for the rigidly-mounted system. Second, the shock-isolated systems degrade either the frequency response, or the amplitude response, of the internal accelerometers to the rigid-body motions of the protective canisters. This factor further reduces the fidelity of the measurements with regard to defining the motion of the medium. Third, the cable protection systems of the shock-isolated systems are inferior to the gauge of the current invention either in robustness or in flexibility.

SUMMARY OF THE INVENTION

In the present invention a strain isolation mechanism is provided to isolate the accelerometer from deformation in the protective canister by means of at least one stiff coupling member which joins the accelerometer to the protective canister mechanism. This gauge is operable at stress levels to about 90,000 psi. The gauge is preferably disc-shaped and has a measuring axis which would be its short central axis perpendicular to the plane of the disc. For example, in FIG. 2, described hereafter, the measuring axis would be the central vertical axis of the bottom section shown therein as at Y—Y. The loading area of the gauge generally normal to the measuring axis of the gauge to mass ratio is 0.018 square meters per kilogram or more. The loading area is the exterior area of the gauge projected onto the plane of the disc. The ratio of the overall dimension transverse to the measuring axis to the overall dimension along the measuring axis of the canister is about 2.9 or greater. The thickness of the canister in the direction of the measuring axis is from about 0.8 inch to about 1.2 inches, and the thickness is preferably the minimum thickness to withstand an anticipated normal stress level. The signal cable from the accelerometer is preferably protected by a metal tubing upon egress of said cable from the canister. In one embodiment the gauge comprises a bottom section having a central cavity, an accelerometer positioned atop a stiff mounting plate which is itself positioned atop a TEFLON or other tough, low coefficient friction polymer bearing which is positioned in the central cavity and a cover means positioned over the central cavity.

The purpose of the high-fidelity particle velocity gauge of the present invention is to measure the strong motions induced in a solid medium, such as soil, natural rock, or concrete, by a high-powered (large energy transfer per unit time) energy source, such as an electrical exploding bridgewire, an -impact from a projectile onto the medium, or a high-explosive or nuclear-explosive detonation. The strong motions which are measured are those of translation (not rotations). The motion parameter of acceleration-history is measured directly, with the parameters of velocity-history and displacement-history inferred through mathematical integrations of the measured accelerations.

The design of this high-fidelity particle velocity gauge allows it to make accurate measurements in environments of over 90,000 psi of normal (medium) stress, displacements of several feet, and accelerations which can exceed 50,000 g's. The maximum stress and acceleration environment in which the instrument can perform is adjustable through the choice of critical dimensions of the instrument, by choice of the internal sensor, and by choice of materials for the instrument.

The design of the instrument and choice of materials, in accordance with the developments contained in Welch (1993), cause the instrument to follow, and to measure, the motion of the medium with much greater fidelity than previous instruments. The design of the instrument incorporates a strong, but flexible, cable protection system to protect the electrical cable from the internal sensor to external electrical amplifiers and recorders. The flexibility of this cable protection system further improves the fidelity with which the instrument measures and follows the medium's motion.

The high-fidelity particle velocity gauge uses a commercial, high-range accelerometer (Endevco Corporation Model 7072 High-Range Accelerometer) as the internal sensor. This instrument undergoes changes in electrical resistance, which result in electrical offsets in the measured signal, when the base of the accelerometer is strained. Thus, given the large stresses to which the high-fidelity particle velocity gauge is subjected, and its resultant straining, the accelerometer's base must be isolated from the gauge. A special mounting system, which provides a low-shear stress boundary, is incorporated into the high-fidelity particle velocity gauge to minimize the straining of the internal accelerometer's base. This mounting system performs this function, while still providing a relatively high-frequency response in the direction of the measuring axis of accelerometer.

BRIEF DESCRIPTION OF THE DRAWINGS

A preferred embodiment of the particle velocity gauge of the present invention is further described with reference to the attached drawings in which:

FIG. 4 is a plan view of the steel button component of the gauge;

FIG. 5 is a cross sectional view of the steel button component through line V—V of FIG. 4;

FIG. 6 is a plan view of the TEFLON bearing component of the gauge;

FIG. 7 is a cross sectional view of the TEFLON bearing component through line VI—VI of FIG. 6;

FIG. 8 is a plan view of the top section of the gauge;

FIG. 9 is a cross sectional view of the top section through line IX—IX of FIG. 8; and FIG. 10 is a detailed cross sectional view of an arrangement of elements used to protect cable in the gauge.

DETAILED DESCRIPTION OF THE PREFERRED EMBODIMENT

Four parts comprise the gauge body or canister. These parts are the gauge bottom section, the gauge top section, the steel mounting plate or button and TEFLON bearing.

Five parts comprise the cable protection system which are two miniature glazed nuts, two stainless steel ferrules and a piece of tubing which is preferably 3/16 in. O.D. by 0.090 in. I.D. and which is 24 in. (or longer) and is a stainless steel alloy 304, 316 or 321.

Figure 1:
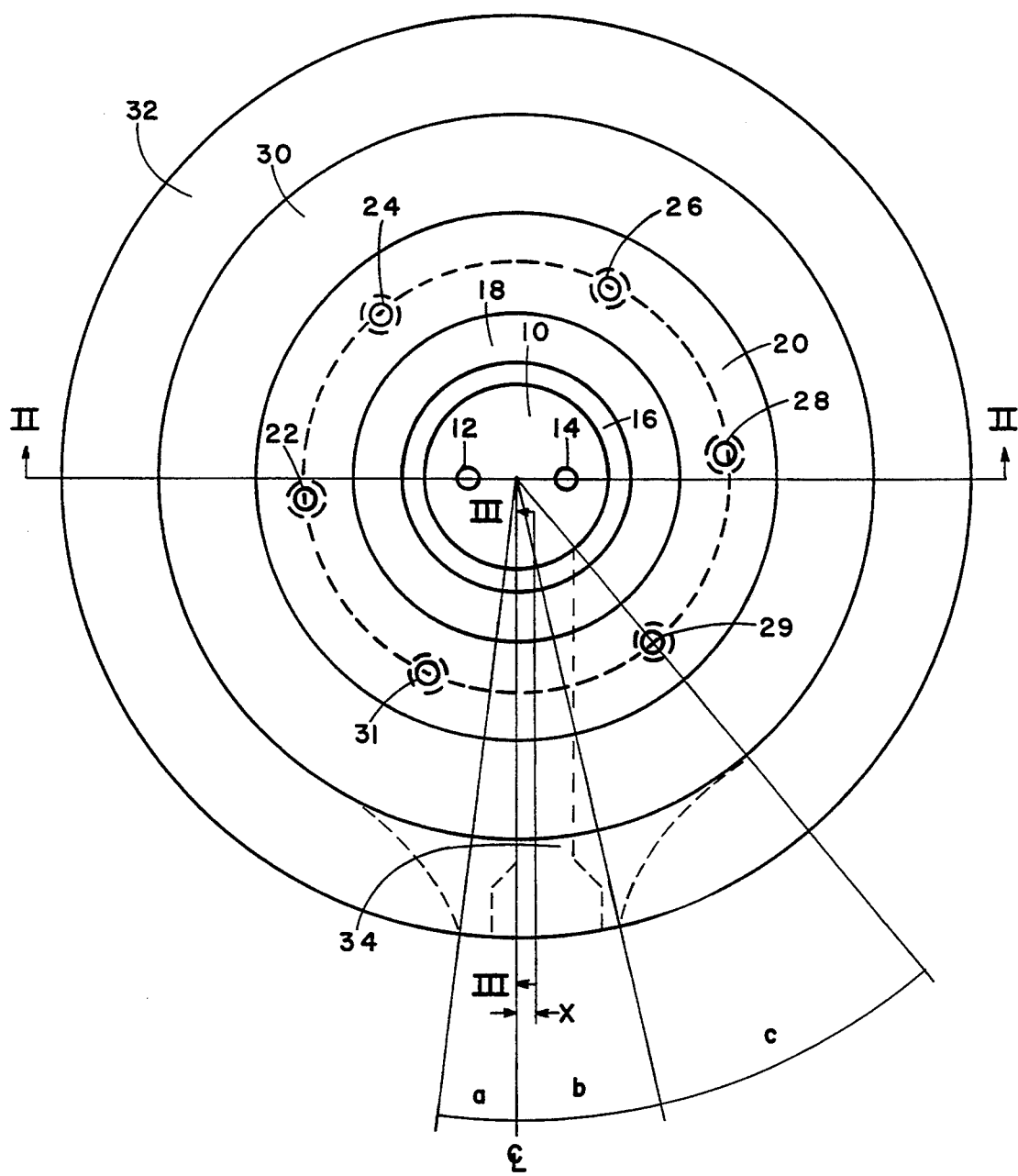
FIG. 1 is a plan view of the bottom section of the gauge.
Figure 2:
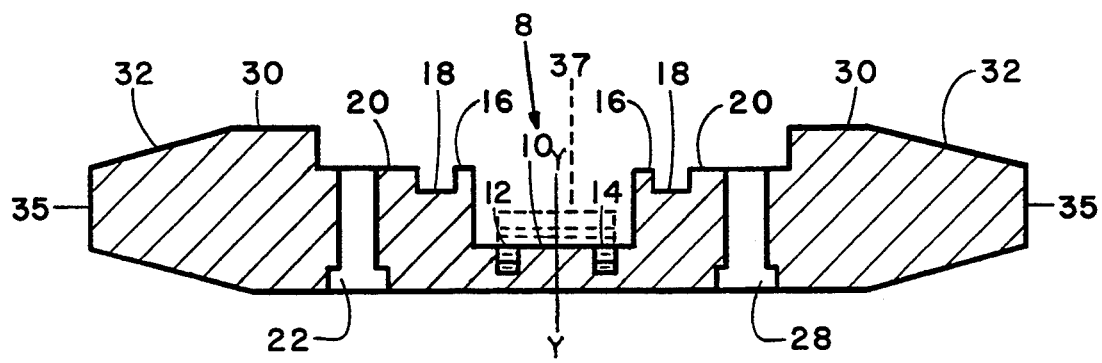
FIG. 2 is a cross sectional view of the bottom section of the gauge through line II—II in FIG. 1, along with a schematic representation of an accelerometer and strain isolation means assembly shown in phantom lines.
Figure 3:
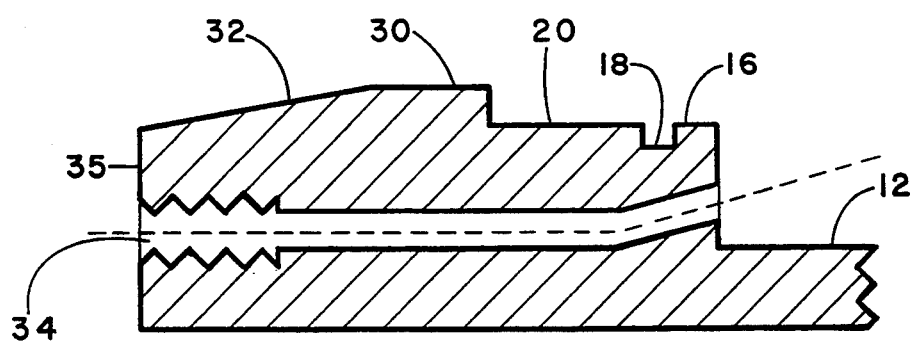
FIG. 3 is a cross sectional view of the bottom section through line III—III in FIG. 1.

Referring to FIGS. 1–3, the gauge bottom is preferably machined from a single piece of material and consists of a 0.800-in. thick by 1.750-in. radius plate. The top portion of the plate is beveled along the entire top edge at an angle of approximately 30°. The bottom edge is beveled at the same angle over an arc of approximately 340° using a 1.00-in. or larger end-mill. A central circular cavity shown generally at numeral 8 (FIG. 2) is machined into the center of the plate. The bottom central surface 10 of this cavity is drilled and tapped for two screws 12 and 14 which are preferably 4–40. Concentrically outward from the central surface there is a raised surface 16 and depressed surface 18 in which an O-ring preferably will be a PARKER 2-119. Still concentrically outwardly there will be another surface 20 which is raised to the level of surface 16 and in which six holes 22, 24, 26, 28, 29 and 31 are drilled and counterbored for 8-32 socket head cap screws. Still further concentrically outward there is a further raised surface 30 and then a slightly downwardly sloping surface 32 after which there is a vertical peripheral edge surface 35. There is also a channel outlet 34 for the exit of accelerometer cable. This cable channels is asymmetrical relative to the center of the gauge. On FIG. 1, measuring from the center line (CL), angle a might preferably be 7 degrees, angle b might be 13 degrees, angle c might be 40 degrees and distance x might be 0.1 inch. While an accelerometer is not strictly a part of this bottom section, the relative position of an accelerometer and its attendant strain isolation mechanism is shown in phantom lines at 37 on FIG. 2. As is explained below, the accelerometer rests atop a stiff coupling member such as a metal plate or button which sits itself atop a bearing surface which consists of TEFLON or other low coefficient of friction polymer. The gauge bottom is preferably manufactured from 7075-T6 aluminum for application to environments with normal stress to 35,000 psi. For environments greater than 35,000 psi, the gauge bottom is preferably machined from 4340 steel and hardened to 180,000-psi tensile strength. For the higher stress levels the gauge bottom is also thickened up to 1.200 in. or more, with the additional thickness being used to increase the thickness of the bottom of the central circular cavity.

Referring to FIGS. 4 and 5, the steel mounting button has four apertures 38, 40, 42 and 44 drilled through it. Preferably this component will be 0.750 in. diameter by 0.100 in. thick plate. Four holes will preferably be drilled through the bottom; two to pass 4–40 screws, and two drilled and tapped for 4–40 threads.

Referring to FIGS. 6 and 7, the TEFLON bearing has two apertures 46 and 48. Preferably it is 0.750-diameter by 0.050-inches thick TEFLON plate. Two holes are drilled through the bearing to pass 4–40 screws.

Referring to FIGS. 8 and 9, the gauge top has six apertures 50, 52, 54, 56, 58 and 60. Preferably it consists of a 1.994-in. diameter by 0.200-in. thick steel plate, machined from 4340 steel, and heat-treated to 180,000-psi tensile strength. Six holes are drilled and tapped into the gauge top for 8–32 threads. For applications in environments above 35,000 psi normal stress, the gauge top is preferably increased in thickness up to 0.400-in. thick.

Referring to FIG. 10, a protection system for an accelerometer cable 61 used in the gauge is formed of a stainless steel tube 62, a miniature gland nut as at 64 and a ferrule 66. The miniature gland nuts may be machined from ⅜-in. by ½-in. long, 16 UN-threaded stainless steel bolts. These nuts are drilled through their center to pass the 3/16-in. diameter steel tubing. The steel tubing is passed through the gland nuts with the threads of each gland nut facing outboard. One stainless steel ferrule is placed on each end of the 3/16-in. diameter tube, and welded to the tube to contain the gland nuts on the tube.

To assemble the gauge, two preferably 4–40 machine screws are passed through the steel mounting button, and the TEFLON bearing, and into the drilled and tapped holes at the bottom of the central circular cavity in the gauge bottom. The length of the screws, and the torque applied to the screws, are selected so that the assembly is firmly and securely affixed to the cavity bottom.

An accelerometer which may be a ENDEVCO Model 7072-A high-range accelerometer is then mounted onto the steel mounting button with the cable from the accelerometer, first knotted, and then passed through the cable egress hole. The knot on the cable should remain inside and at the end of the 7/32-in. diameter section of the hole. When the gauge is fully assembled, the knot serves to prevent tensile forces, if applied to the free-end of the accelerometer cable, from being passed onto the accelerometer. The accelerometer is mounted onto the steel mounting button according to the manufacturer's recommendations.

The miniature cable protection system is next threaded onto the accelerometer cable, and screwed into the corresponding threads in the cable egress hole of the gauge bottom. In application, the accelerometer cable is spliced onto another electrical cable protected using other cable protection systems not described here. An O-ring is next placed into the O-ring gland. The gauge top is lastly placed onto the gauge bottom, and firmly and securely fixed using six 8–32 socket head cap screws. These pass through the gauge bottom and into the corresponding threads machined into the gauge top.

Although the invention has been described with a certain degree of particularity, it is to be understood that the present disclosure has been made only as an example and that the scope of the invention has been only as an example and that the scope of the invention has been defined by what is hereafter claimed.

What is claimed is:

1. A particle velocity gauge, comprising:
   a) a protective canister, said canister being generally disc-shaped and having a top section and a bottom section defining a central cavity;
   b) an accelerometer positioned and mounted in the bottom of said central cavity atop a stiff mounting plate which is affixed atop a tough low coefficient of friction polymer bearing and being in communication with a signal cable protected by a metal casing upon egress of said cable from said gauge;
   said disc-shaped gauge has a measuring axis through its short central axis, a loading area normal to said measuring axis and a diameter dimension transverse to said measuring axis; and
   said gauge has a thickness in the direction of measurement from about 0.8 inch to about 1.2 inches and at a minimum thickness to withstand normal stress levels.

2. The particle velocity gauge of claim 1, wherein said stiff mounting plate is made from steel.

3. The particle velocity gauge of claim 1, wherein said low coefficient friction polymer bearing is made of TEFLON.

4. The particle velocity gauge of claim 1, wherein said bottom section is machined from a single piece of material.

5. The particle velocity gauge of claim 1, wherein said top section, said bottom section, said stiff mounting plate and said low coefficient friction polymer bearing define a strain isolation means for isolating the accelerometer from deformation in said bottom section.

6. The particle velocity gauge of claim 1, wherein said bottom section is made from the group consisting of 7075-T6 aluminum and 4340 steel.

7. The particle velocity gauge of claim 1 wherein said top section is made from 4340 steel.

8. The particle velocity gauge of claim 1, wherein said top section is a plate which is removably fixed to said bottom section.

9. The particle velocity gauge of claim 1, wherein said accelerometer, said stiff plate and said polymer bearing are removably fixed to said bottom section by common fastening means.

10. The particle velocity gauge of claim 1, wherein its loading area normal to the measuring axis of the gauge to mass ratio is about 0.018 square meters per kilogram or more.

11. The particle velocity gauge of claim 1, wherein the ratio of the said transverse dimension to the measuring axis dimension is at least about 2.9.

12. The particle velocity gauge of claim 1, wherein the thickness in the direction of measurement of said gauge permits said gauge to be operable at stress levels to about 90,000 psi.

* * * * *